United States Patent [19]

Ruedinger et al.

[11] Patent Number: 5,450,572
[45] Date of Patent: Sep. 12, 1995

[54] QUASI-SYNCHRONOUS INFORMATION TRANSFER AND PHASE ALIGNMENT MEANS FOR ENABLING SAME

[75] Inventors: Jeffrey J. Ruedinger, Rochester, Minn.; Peter Rudolph, Schönaich; Hermann Schulze Schölling, Gärtringen, both of Germany

[73] Assignee: International Business Machines Corporation, Armonk, N.Y.

[21] Appl. No.: 916,319

[22] Filed: Jul. 17, 1992

[30] Foreign Application Priority Data

Jul. 20, 1991 [DE] Germany ............... 91112177.0

[51] Int. Cl.⁶ ..................... G06F 1/04; G06F 13/00
[52] U.S. Cl. ..................... 395/550; 364/270.7; 364/271.2; 364/DIG. 1; 375/364; 375/354; 375/371
[58] Field of Search ............. 364/DIG. 1, DIG. 2; 395/550, 530, 118; 375/113, 106

[56] References Cited

U.S. PATENT DOCUMENTS

| | | | |
|---|---|---|---|
| 3,588,703 | 6/1971 | Sorkin et al. | 375/358 |
| 3,970,997 | 7/1976 | Daly et al. | 340/172.5 |
| 4,119,796 | 10/1978 | Jones | 178/69.1 |
| 4,208,724 | 6/1980 | Rattlingourd | 364/900 |
| 4,596,026 | 6/1986 | Cease et al. | 375/118 |
| 4,677,614 | 6/1987 | Circo | 370/86 |
| 4,691,294 | 9/1987 | Humpleman | 395/550 |
| 4,782,499 | 11/1988 | Clendening | 375/113 |
| 4,873,703 | 10/1989 | Crandall et al. | 375/118 |
| 4,881,165 | 11/1989 | Shoer et al. | 364/200 |
| 4,943,984 | 7/1990 | Pechanek et al. | 375/109 |
| 5,208,913 | 5/1993 | Yamamoto | 395/250 |
| 5,293,409 | 3/1974 | Doornenbal et al. | 375/106 |

FOREIGN PATENT DOCUMENTS 0175564 3/1986 European Pat. Off. .
0347557 12/1989 European Pat. Off. .

*Primary Examiner*—Kevin A. Kriess
*Assistant Examiner*—Lucien U. Toplu
*Attorney, Agent, or Firm*—Arthur J. Samodovitz

[57] ABSTRACT

A quasi-synchronous information (clocking, data, control signals) transfer between a master unit A and at least one neighbor unit B offers the advantage that one transfer can occur every cycle where any interface delays are tolerated. When the master unit A sends its internal clock along with data and/or control signals to its neighbor unit B, the last named unit receives this clock and derives any and all locally required clocks from this clock. This keeps unit B exactly at the same frequency as unit A, although a phase shift occurs. Unit B also sends its internal clock along with data and/or control signals to unit A. When the clock signals arrive back at unit A, they will have exactly the same frequency as the internal clock of unit A but also an additional phase shift. Compensation of the overall phase shift will be done by a phase alignment means to which all signals are sent on their way to unit A.

19 Claims, 7 Drawing Sheets

1  CLOCK A CYCLE
2  INTERNAL CLOCK A
3  DATA LEAVING A
4  INTERNAL CLOCK B
5  A DATA CAPTURED AT B
6  DATA LEAVING B
7  CLOCK B CYCLE
8  INTERNAL CLOCK ON B SIDE OF PHASE BUFFER
9  B DATA CAPTURED AT B SIDE OF PHASE BUFFER
10 INTERNAL CLOCK ON A SIDE OF PHASE BUFFER
11 DATA OUT OF BUFFER SENT TO A'S RECEIVE LOGIC SYNCHRONIZED TO A'S INTERNAL CLOCK

QUASI-SYNCHRONOUS INFORMATION TRANSFER AND PHASE ALIGNMENT MEANS FOR ENABLING SAME

BACKGROUND OF THE INVENTION

The invention generally refers to a method of quasi-synchronously transferring clocking-, data-, and/or control signals between two or more data processing units and to a phase alignment means for enabling same.

FIGS. 1A–C show a block diagram and timing diagrams of how a synchronous and an asynchronous interface work. Since they are widely known, only the important summary points are dealt with in the following:

Synchronous Interface (FIG. 1A, B)
 The clock signals of units A and B have the same frequency and the same phase relationship.
 One data transfer can occur every cycle via connecting cables 1 and/or 2.
 Any interface delays must be adjusted to exactly align the internal clocks of both units. For a system involving a cable and interface drivers, this may be a very difficult job to realize.

As can be seen from FIG. 1B, a synchronous interface can be used to send data from unit A to unit B or vice versa without waiting to see if unit B or A received each data transfer successfully (correctly). The synchronous interface, however, requires that the sender and receiver be in a "lock-step" with one another which means that the receiver reads the data at the same time the sender sends the data.

FIG. 1B shows an example, where a section of six clock cycles 1A . . . 6A, 1B . . . 6B respectively are used to transfer six data units (bits, bytes, words, etc. depending on the number of parallel lines) D1 . . . D6, D10 . . . D15 respectively from unit A to unit B and/or vice versa.

The clock pulses of the internal clock of unit A and unit B have the same frequency and phase, as can be seen from FIG. 1B. Data unit D1 which is sent during clock cycle 1A of unit's A internal clock via cable 1 will be received at unit B during the next clock cycle 2B of unit's B internal clock. Data unit D10 which is sent from unit B over cable 2 at the same time as data unit D1 will be received at unit A during clock cycle 2A of unit's A internal clock.

Asynchronous Interface (FIG. 1A, C)
 The clock signals of units A and B have different frequencies and different phase relationships.
 Multiple cycles are required for every data transfer.
 Any interface delays can exist, within the required limits of propagation delay and skew. For this reason, many external interfaces from box to box are done asynchronously.

Using an asynchronous interface, unit A sends data, one transfer at a time and waits to send the next transfer until unit B replies that it received the data correctly.

As can be seen from the pulse diagram in lines four and five of FIG. 1C, two more interface lines are necessary for transmitting control signals. In the case of a data transfer from unit A to unit B a control signal from unit A is sent to unit B, meaning new data is on the bus. The other control signal is a reply signal from unit B sent to unit A, meaning unit B read the data.

As further can be seen from lines three and eight of the pulse diagram in FIG. 1C, multiple cycles are required for every data transfer. To transfer a data unit D1 from unit A to unit B almost four clock A cycles are necessary until this data unit D1 is completely captured at unit B. When data from unit B have to be transferred asynchronously to unit A then the complete process has to be reversed.

As can be seen from the description above, both interfaces have their advantages and disadvantages. The advantage of a synchronous interface is, that one data transfer can occur every cycle. Its disadvantage, however, is that any interface delays must be adjusted to exactly align the internal clocks of both units. An asynchronous interface has the advantage, that any interface delays can exist, within the required limits of propagation delay and skew; its disadvantage, however, is that multiple cycles are required for any data transfer.

Therefore, it is the object of the present invention to avoid the disadvantages listed above of both interfaces and keep at the same time their advantages.

SUMMARY OF THE INVENTION

The invention resides in a system and method for transferring data and/or control signals between two or more data processing units. According to the invention, one or more clock signals are generated in one of the data processing units. These clock signals are used to time processing within the one unit. Then, the clock signals and data signals and/or control signals are passed from the one data processing unit to another of the data processing units. The passed data signals and/or control signals have the same frequency and phase as the clock signals. The clock signals passed to this other unit are used to derive a clock for this other unit. Then, these clock signals are returned from this other unit to the one unit, along with data signals and/or control signals from this other unit. The returned clock signals are shifted in phase relative to the clock signals when generated in the one unit. Next, the phase of the data signals and/or control signals at the one unit passed from the other unit is shifted to match the phase of the clock signals when generated in the one unit. Afterwards, these data signals and/or control signals are used in the first unit.

Thus, the invention offers the data streaming advantage of synchronous interfaces without having to pay the penalty of asynchronous interfaces. The penalty that has to be paid is an added delay in the time it takes the first message from the sender to arrive at the receiver, but not in the overall data throughput.

Furthermore, the invention allows various parallel processor system designs where various lengths of interconnecting lines or cables can be used in a highly flexible manner.

Embodiments of the invention will be described in detail below with reference to the accompanying drawings in which:

DETAILED DESCRIPTION OF THE PREFERRED EMBODIMENTS

Figure 1A:
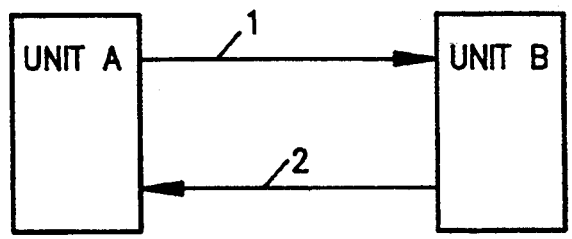
FIG. 1A to 1C is a schematic representation of known synchronous or asynchronous interfaces and their respective pulse diagrams, FIG. 2A, B is a schematic representation of a "quasi" synchronous interface and its pulse diagram.
Figure 1B:
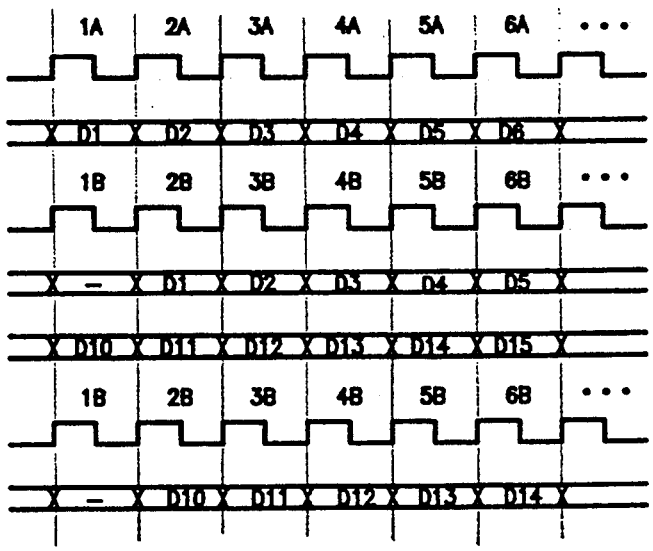
Figure 1C:
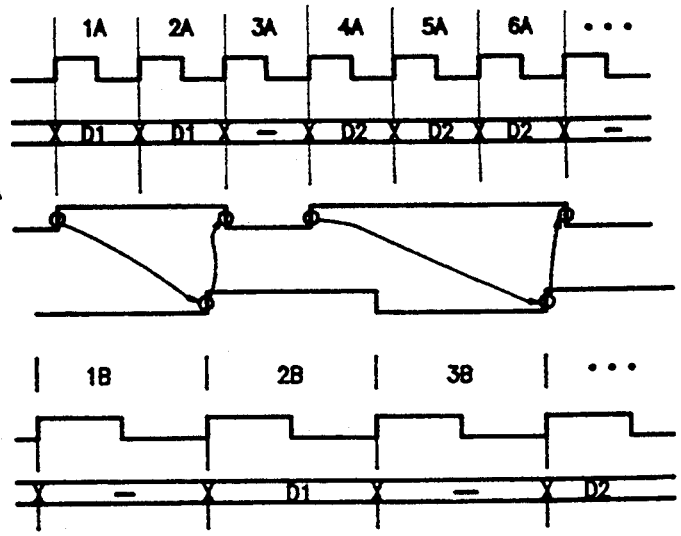

In contrast to synchronous and asynchronous prior art interfaces (FIGS. 1A-C), FIG. 2 shows how a "quasi-synchronous" interface can be used to keep the advantages of both interface types (synchronous, asynchronous) and to remove their disadvantages. The basic solution is centered around a method of keeping the same frequency for both units, and compensating for the difference in phase using a phase alignment means. Keeping the same frequency allows the units to make one data transfer per cycle, while permitting a phase difference allows them to remove the requirement of making interface delay adjustments to align the units' clocks.

Figure 2A:
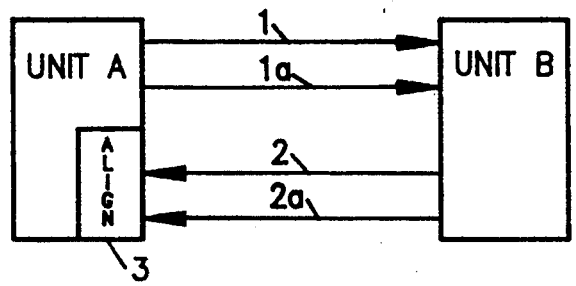

To understand the quasi-synchronous interface better, reference is made to FIGS. 2A, B. The term "clock" is used to refer to either a single clock or a group of clocks, depending on the implementation of the logic chosen. If a group of clocks is used, then the skew between the individual clocks of the group as they propagate throughout the system must be taken into consideration. However, for the purposes of this example no skew problems of this type are covered since they do not relate to the arrangements described.

Figure 2B:
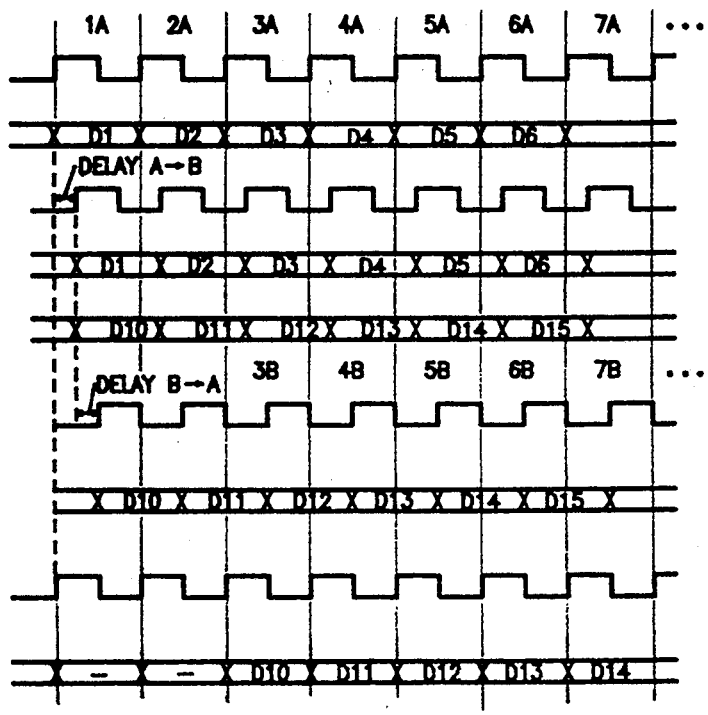

It is assumed that unit A sends its internal clock along with data and control signals on separate lines 1, 1a to unit B, data and/or control lines on cable 1 and the clock on line 1a (cf. lines 2,3; FIG. 2B). Unit B receives this clock and derives any and all local clocks from this clock. This keeps unit B at the exact same frequency as unit A, although a phase shift does occur. The propagation delay as well as the phase shift can be lumped into one item and are referred to as DELAY A→B (cf. line 4; FIG. 2B). Since unit B's clock is synchronized with the data coming from unit A, it can accept data at a rate of one transfer per cycle (cf. line 5; FIG. 2B).

In the opposite direction unit B sends its internal clock along with data and control signals back to unit A via line 2a and cable 2. When this clock arrives at unit A, it will have exactly the same frequency as the clock internal to unit A, however, it will have a phase shift DELAY B→A equal to the phase shift introduced from unit A to unit B, plus the phase shift introduced when sending from unit B to unit A (cf. line 8; FIG. 2B). The entire interface enters unit A through a phase alignment means 3 whose purpose is to compensate for the phase shift of the signals arriving at the phase alignment means 3 from unit B relative to the internal clock of unit A (data and control signals leave the phase alignment means 3 aligned with unit A's internal clock). The internal design of the phase alignment means 3 is not important at this point. Many designs can fulfill the requirement above e.g. a phase alignment buffer. What is important, however, is that both data and control lines from unit B to unit A are treated as part of the data path in the buffer since both are phase shifted and need to be realigned. Another important point is that all phase buffer clocks used on the unit B side of the buffer are derived from the clock received from unit B (there is no clock adjusting or matching involved).

Figure 3A:
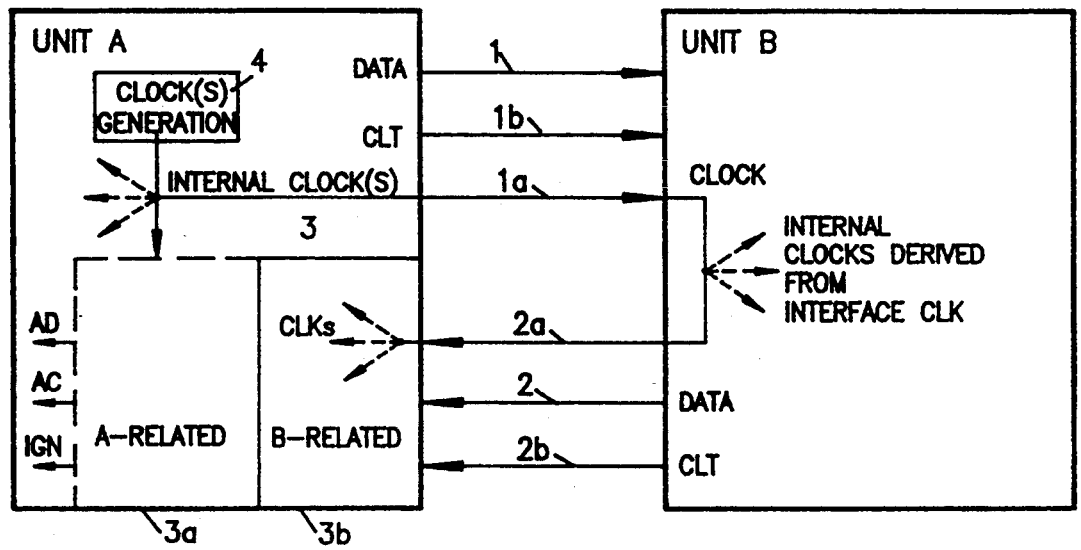
FIG. 3A is a block diagram of an interface shown in FIG. 2A.

In FIGS. 2A and 3A the phase alignment means 3 are shown as boxes (circuit arrangements) which are contained in unit A. The phase alignment means 3, however, can also be separate boxes which are connected to the units A and B.

FIG. 3A shows that the phase alignment means 3 is split into parts 3a and 3b which are related to different clock domains. Whereas part 3a is related to the internal clock A (internal clock on A-side of the phase alignment means), is part 3b related to internal clock B (internal clock on B-side of the phase alignment means).

The clock generation takes place by a clock generator 4 only in unit A. All clock pulses necessary to control unit A or unit B are derived from the (master) clock pulses of clock generator 4. If necessary the clocks are distributed by various clock distributors 8, 9, 11-14 within the units A-E to the units internal circuitry.

All data AD and control signals AC leaving part 3a of the phase alignment means 3 are aligned with the internal clock of unit A. Another signal IGN which is derived from the phase alignment means 3 is used to characterize signals leaving the phase alignment means as being invalid. This ignore signal IGN will be described in greater detail in connection with FIGS. 3B and FIGS. 4A-E.

The system described above can be defined as a quasi-synchronous interface which has the properties listed below:

Units have the same frequency, but different phase.
One data transfer can occur every cycle.
Any interface delays can be tolerated.
Additional logic in the form of a phase alignment buffer must be added to the first unit.

An important part of the quasi-synchronous interface is the phase alignment buffer. This section describes one possible implementation of the buffer, however, other implementations are possible and the choice is largely implementation dependent. Designs which vary from this implementation but still meet the quasi-synchronous interface must be regarded as being within the scope of this description.

The buffer chosen to be described here is designed to meet the requirements of an on-chip buffer which has a minimum latency and does not have an interruptible data stream. This means that once the system is initialized and a data stream starts, it is not interrupted under normal circumstances even for one cycle. A defect in the system such as the cable from unit A to unit B becoming disconnected would be an error condition and not a normal circumstance.

Figure 3B:
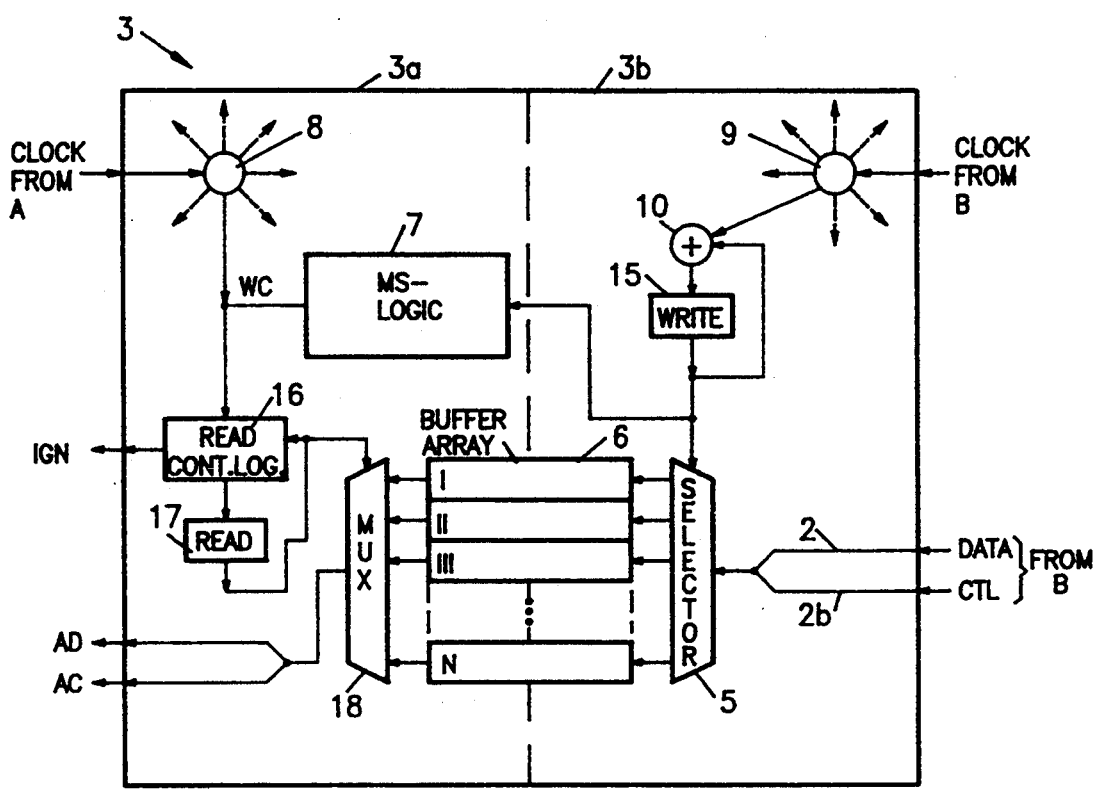
FIG. 3B is a block diagram of a phase alignment circuitry necessary for use in "quasi" synchronous interfaces.

Referring to FIG. 3B, it can be seen, that both the signals on the data 2 and control 2b lines from unit B to the phase alignment buffer 3 are merged together and treated as data and passed through an input selector 5 into a particular location I-N in the buffer array 6. This location is defined by the contents of a WRITE pointer stored in 15 which acts as an address pointer onto the locations of the buffer array. The WRITE pointer is updated (e.g.incremented) by adder 10 on every clock cycle which comes across the interface from unit B. Its value is passed to the other side 3a using metastability prevention compensation techniques (MS logic) 7 for comparison with a READ pointer. The WRITE pointer wraps back upon itself when it reaches the last address of the array (e.g. modulus 4 array; WRITE=0-1-2-3-0-1-2-3-0- . . . ). The array has the property of being able to be written with one clock (from B) and read under control of a second different clock (from A).

On the read side 3a of the array, buffer locations I-N are read on every clock cycle from the internal clock from unit A. Reading outputs the interface conditions written in by the B side with a given offset of time. The READ pointer stored in 17 chooses the array location to be gated onto the read side data and control lines which are fed into the receive logic of unit A. The READ pointer also wraps around itself when it reaches the last address of the array, just like the WRITE pointer does. Data AD and control AC lines leaving the phase buffer 3 via multiplexer 18 and going to the receive logic of unit A are exactly synchronized both in frequency and phase to unit A's clock because they are read out of the array using unit A's internal clock. When both the READ and WRITE pointers reach the end of the buffer array 6, they wrap around to the first buffer location.

Metastability (MS) logic 7 and Read Control Logic 16 are used to determine whether the information stored in the currently indicated buffer is valid or not, and whether to advance the READ pointer or not. Buffer contents becomes invalid if the write side clock stops for any reason (controlled stop, error stop) while the read side clock is still running. This control logic resides on unit A's clock domain. It is broken into two parts. The first part 7 captures a valid copy of the WRITE pointer into the same clock domain as the READ pointer (on unit A's internal clock). The second part 16 uses this copy of the WRITE pointer to decide the validity of the buffer contents and whether to increment the READ pointer. The WRITE pointer must always be ahead of the READ pointer. If both point to the same buffer location, the read output becomes invalid and has to be ignored by the unit A receive logic.

For the moment, it is assumed that a valid copy of the WRITE pointer can be obtained on the read side clock domain; this copy is called WRITECOPY WC. The read control logic 16 is used to determine the data validity and advancing of the READ pointer as follows:

| | |
|---|---|
| IF (READ = WRITECOPY) THEN | * The pointers are the same |
| ACTIVATE IGNORE, | * Tell receive logic data is INVALID |
| DO NOT INCREMENT READ | * Wait until pointers are different |
| ELSE | |
| DEACTIVATE IGNORE, | * Tell receive logic data is VALID |
| INCREMENT READ. | * Point to the next array location |

With this read control logic 16, if the IGNORE line becomes active it means that the write side of the phase buffer did not receive a clock from unit B. This can happen in two situations. The first case is when the system is initializing and the clocks which have left unit A are still propagating through unit B and back into the phase buffer of unit A. Until the first clock reaches the phase buffer WRITE pointer, IGNORE will be active. The second case is when the path from A to B to phase buffer 3 was broken somewhere. In either case the receive logic in unit A should treat both the data and control lines leaving the phase buffer as invalid until the IGNORE line becomes inactive.

A detailed description of the buffer pointer synchronization and adjustment (by MS logic 17) will be given in connection with FIG. 4A-D.

Figure 5:
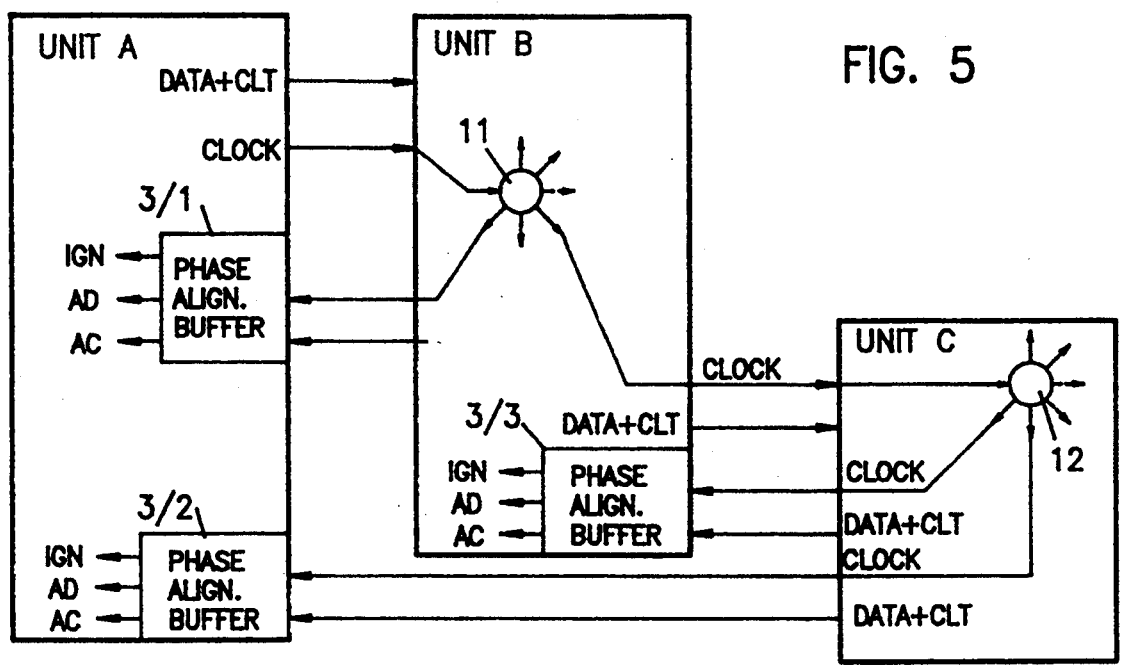
FIG. 5 is a block diagram of an arrangement showing recursive use of a "quasi" synchronous interface.

Recursive use of the Quasi-Synchronous Interface:

The use of the quasi-synchronous interface is not limited to two units A, B. It can be expanded through any collection of units A, B, C, ... as shown in FIG. 5. As long as the same clock frequency is kept, any number of phase delays can be included before reaching the phase alignment buffers 3/1 ... 3/3.

The example configuration in FIG. 5 shows three possible quasi-synchronous paths:
1) Unit A→unit B→BUFFER in unit A (3/1)
2) Unit B→unit C→BUFFER in unit B (3/3)
3) Unit A→unit B→unit C→BUFFER in unit A (3/2)

Each phase alignment buffer 3/1-3/3 has a separate set of output lines on which the aligned data signals AD, the aligned control signals AC and the ignore signal are provided to their respective units A, B and/or C. Clock distributors 11, 12 may also be used in those units where it is necessary to derive more clocks from the master clock.

Figure 6:
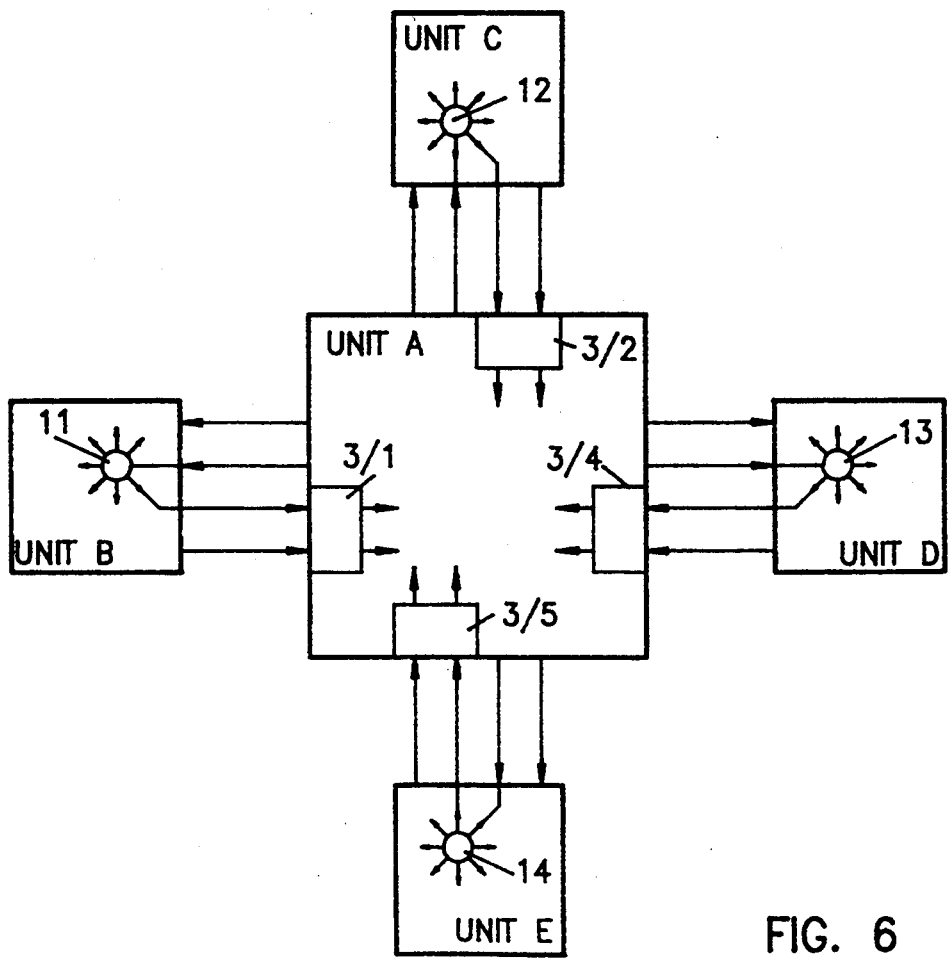
FIG. 6 is a block diagram showing multiple use of a "quasi" synchronous interface.

Multiple Use of the Quasi-Synchronous Interface:

FIG. 6 shows that more than one interface can be controlled from a single unit A. There is no limitation on the number of interfaces that can be controlled, however, one phase alignment buffer (3/1, 3/2, 3/4, 3/5) per returning interface is necessary.

Mapping a Bidirectional Interface into a Quasi-Synchronous Interface:

One important feature of the quasi-synchronous interface is that everything is broken into two unidirectional interfaces, one going each way. This is important to keep the phase shifts adding in the same direction until the phase buffer can realign the information. However, this does not mean that bidirectional interfaces cannot be used, they must only be handled specially.

Figure 7A:
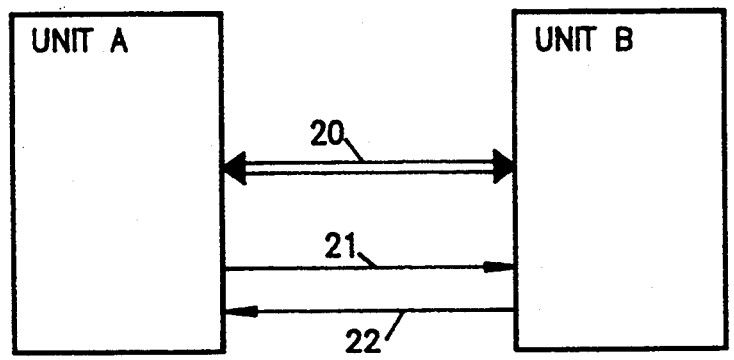
FIG. 7A, 7B are block diagrams of a "quasi" synchronous interface used for bi-directional data and control signals transfer.
Figure 7B:
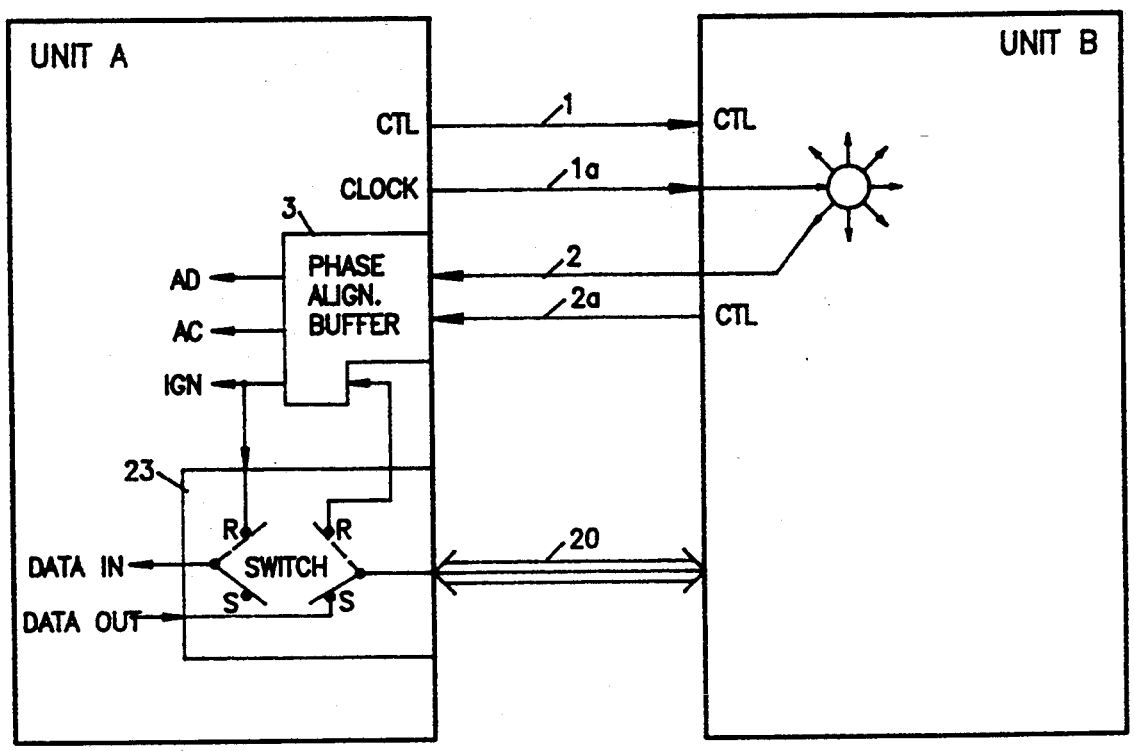

FIGS. 7A, B show how the bidirectional lines 20 must be split on unit A. Unit B sees no difference in its implementation of the bidirectional control logic. However, unit A has a special switch function 23 built in around the normal phase alignment buffer 3.

When unit A is in receive mode (switch in position R), the data path 20 is gated such that data coming from the interface from unit B is routed through the phase buffer 3 before entering unit A's receive logic. When unit A is in send mode (switch in position S), the unit A's output path is connected directly to the interface to unit B. Also during send mode, unit A's receive logic should be connected to a NOP value circuitry (NOP=no operation) that will indicate to unit A's receive logic that the interface is sending and not receiving. One can also leave unit A's receive logic connected to the phase buffer, but since it is still running one does not know what is coming out of it. If unit A's receive logic understands that it should discard the information coming into it, then no special value needs to be assigned.

When in switching modes, a number of NOP cycles should be performed by unit A's receive logic since the data path through the phase buffer must be reestablished with valid data before normal data processing can start. The number of NOP cycles is implementation dependant.

In the Figs. and the above description, data is used to refer to the signals which are bidirectional in nature and control to refer to the signals which are unidirectional. The terms data and control were chosen for the purposes of illustration as this is how a typical bidirectional interface is implemented. Bidirectional signals can also have control functions, likewise unidirectional signals can have data functions. Other implementations of handling bidirectional interfaces are possible; this is only one particular example used for illustration purposes. Getting a copy of WRITE to the READ side clock domain:

Reference is made to FIG. 3B, 4A–E for the following description of the phase alignment buffer write and read control. For ease of drawing, the WRITE pointer is designated W.

To obtain a stable copy of the WRITE pointer W across the clock boundary on every clock cycle, a series of delays $\Delta$ is used to make four different copies F, G, H, J of the contents of the WRITE pointer. The value of $\Delta$ should be strictly chosen by the relationship $\Delta > D_{max}$, $D_{max}$ being a maximal drift, caused by changes in temperature, threshold values, edge slope and noise, interference, ground and voltage shifts etc. Accordingly, $\Delta$ should be less than $\frac{1}{2}$ clock cycle.

Figure 4A:
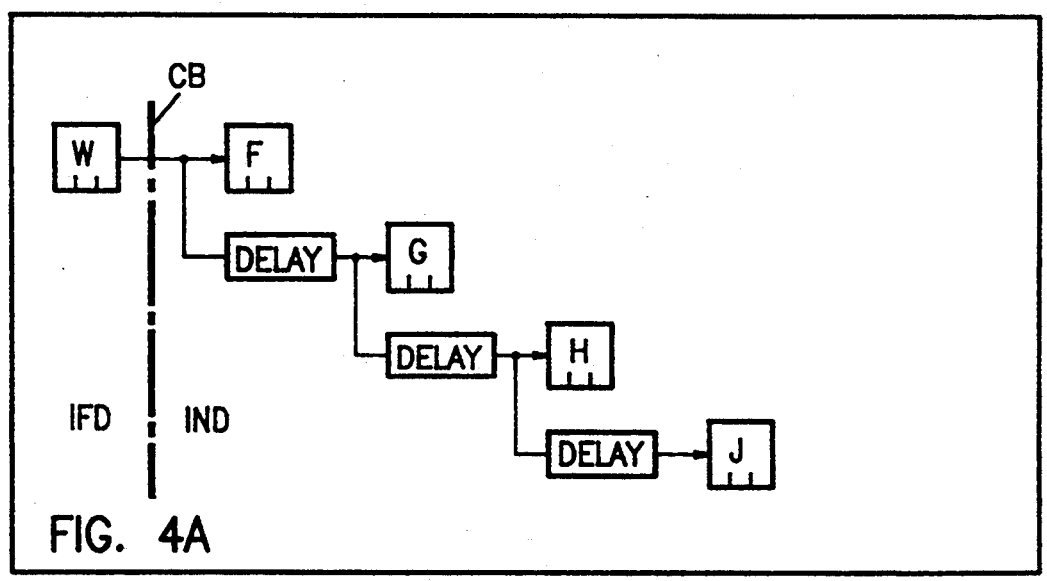
FIGS. 4A to 4D are schematic representations of a phase alignment circuitry shown in FIG. 3B.

FIG. 4A shows the WRITE pointer W on the interface clock domain IFD being sent across clock boundary CB to the internal clock domain IND of unit A and being captured in registers F, G, H, and J within MS-LOGIC 7 with a delay $\Delta$ between F and G, G and H, H and J.

Figure 4B:
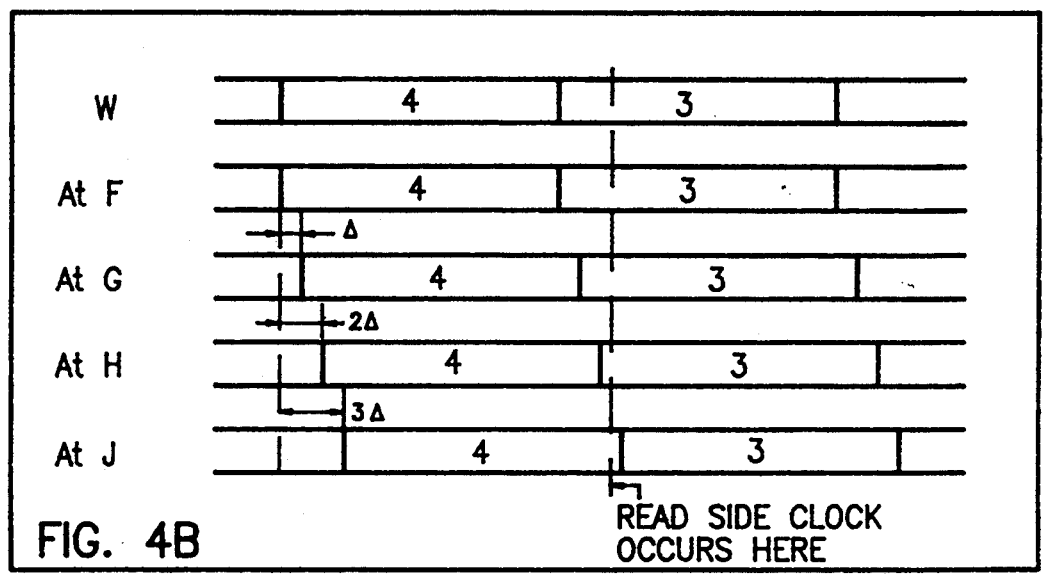

FIG. 4B shows the relative positions of the copies of the contents of W in timing diagram format. As can be seen, data arriving at F is exactly aligned with the changes happening in W (not counting physical delays in the implementation of the circuit). Data arriving at G is delayed in time by $1\Delta$, at H by $2\Delta$, and at J by $3\Delta$. The IND clock will latch all four copies at one time, thus the contents of registers F, G, H, J represent the value of W at different times.

Figure 4C:
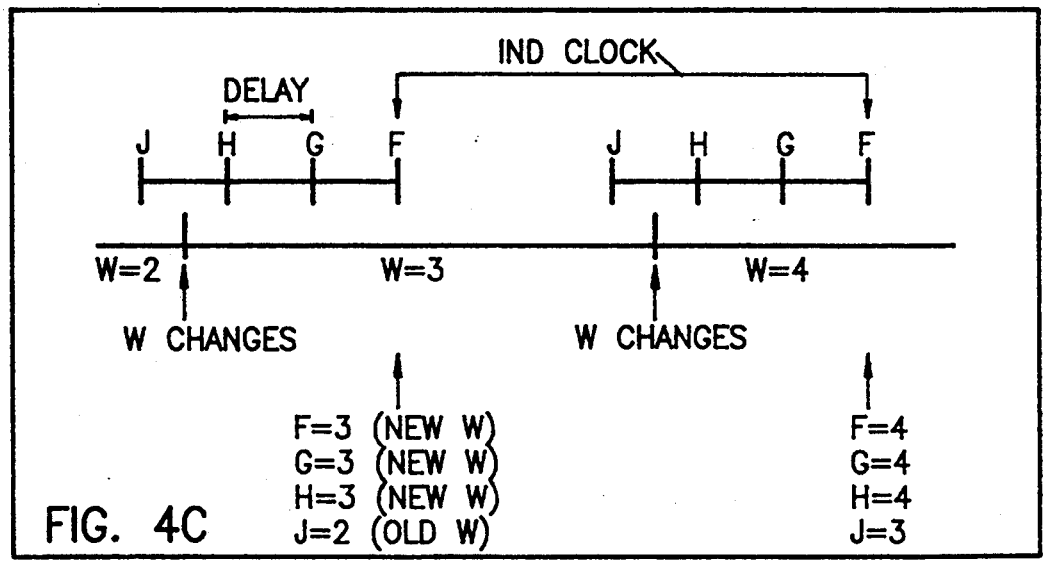

FIG. 4C is the same picture redrawn showing the delays $\Delta$ at different capturing points for F, G, H, J even though in reality all four are being latched simultaneously. The relationship between F, G, H, J is fixed due to the delays $\Delta$ (J is the oldest copy of W, F is the newest) however the actual contents of each varies based on the alignment between unit A's internal clock and the interface clock. This alignment is covered in the next figure which also brings in the concept of "drift".

Figure 4D:
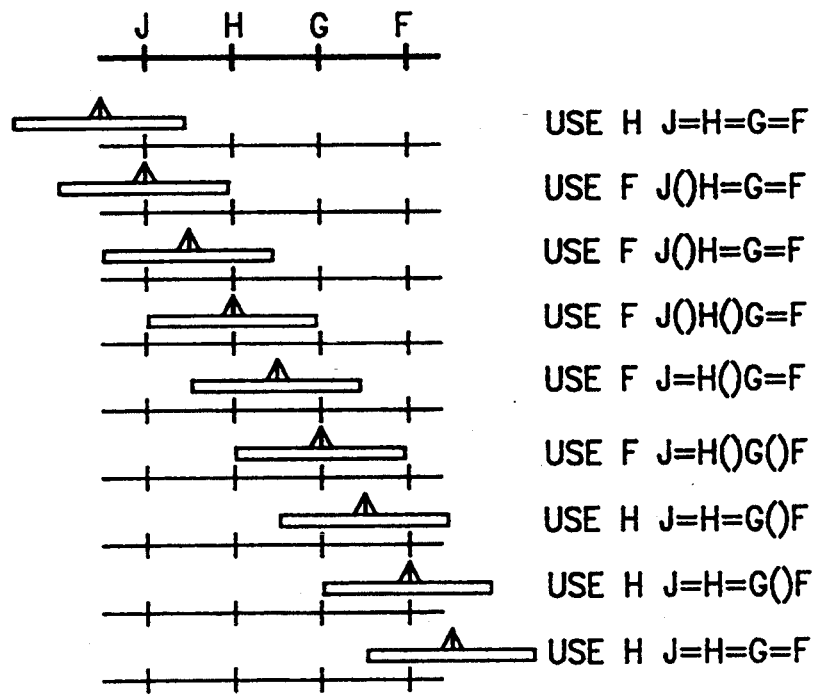
Figure 4D:
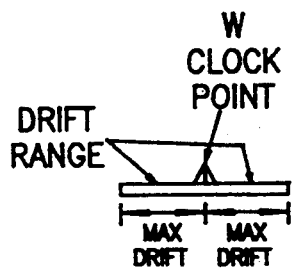

FIG. 4D varies the relationships between the read side clock and the write side clock by moving the point where the write side clock changes data in the WRITE pointer. In the first line, it is shown that the write clock occurs well before the read clock and all four copies of W are equal (J=H=G=F). However, the point where the write clock occurs is shown as a bar with a center point, not just a point. This is due to what is defined as "drift" for the purposes of this description.

The "drift" is the amount of change which can be expected in the write clock edge, relative to the very first clock edge received by the phase alignment buffer. Over time, one would not expect the trigger point of the WRITE pointer to remain the same because things such as temperature changes, threshold changes, clock edge slope changes, noise, interference, ground and voltage shifts, etc. can all affect the point of WRITE pointer triggering. One would expect that this time is small, however, it is not negligible and the value of the delays $\Delta$ must be chosen to be larger than the maximum possible drift one can expect over the system lifetime. The value of this drift is highly implementation dependant, however for this purposes it is assumed that it is in the 2–3 nanosecond range. Therefore, the value chosen for the delay $\Delta$ should be greater than 3 nanoseconds. The value must not be larger than $\frac{1}{2}$ the cycle time, however, so that all four copies of the WRITE pointer are valid each cycle.

Returning to FIG. 4D, there are 9 possible alignments of the write side clock versus the read side clock. These are as follows.

| | | | |
|---|---|---|---|
| 1) | W clock well before R clock | J=H=G=F | WRITECOPY=H |
| 2) | W clock such that J is unstable | J<>H=G=F | WRITECOPY=F |
| 3) | W clock between J and H, J stable | J<>H=G=F | WRITECOPY=F |
| 4) | W clock such that H is unstable | J<>H<>G=F | WRITECOPY=F |
| 5) | W clock between H and G, H stable | J=H<>G=F | WRITECOPY=F |
| 6) | W clock such that G is unstable | J=H<>G<>F | WRITECOPY=F |
| 7) | W clock between G and F, G stable | J=H=G<>F | WRITECOPY=H |
| 8) | W clock such that F is unstable | J=H=G<>F | WRITECOPY=H |
| 9) | W clock well after R clock | J=H=G=F | WRITECOPY=H |

Since the delays between F, G, H, J are larger than the maximum drift range, we know that once the relationship between write side clock and read side clock is known, the relationship between the values of F, G, H, J will also be known and be stable. Therefore, we only need to sample F, G, H, J once after a WRITE clock has happened to know which copy of the WRITE pointer to use as WRITECOPY from then on.

A logic function is implemented in FIG. 3B on the read side clock domain to provide a stable copy of the WRITE pointer to the read side clock domain. The reduced function is as follows.

During initialization, R=F=G=H=J.

```
DO WHILE (READ <> F)
    WRITECOPY = F
END
```

WRITE has moved when READ<>F and the above loop is exited.

```
IF (J=H=G) THEN
    WRITECOPY = H * Unstable zone is not between J
    and G ELSE
    WRITECOPY = F * Unstable zone is somewhere between J
    and G
```

From now on, WRITECOPY always comes from this copy of W.

We claim:

1. A method for transferring data between two data processing units, said method comprising the steps of:
   generating clock signals in one of said units;
   passing the clock signals and data synchronized with said clock signals from said one unit to the other unit;
   receiving said data at said other unit using said clock signals passed from said one unit;
   passing said clock signals received from said one unit and other data synchronized with said clock signals received from said one unit, from said other unit to said one unit, said other data and clock signals passed from said other unit to said one unit arriving at said one unit phase shifted relative to said clock signals generated in said one unit;

shifting the phase of said data arrived at said one unit to match the phase of said clock signals generated in said one unit; and processing the phase matched data at said one unit using the clock signals generated in said one unit.

2. A method as set forth in claim 1 further comprising the steps of:

passing control signals from said one unit to said other unit synchronized with said clock signals and data passed from said one unit to said other unit; and passing other control signals from said other unit to said one unit synchronized with said clock signals and other data passed from said other unit to said one unit.

3. A method as set forth in claim 2 wherein said data from both of said units are passed in both directions between said one unit and said other unit over a bidirectional line.

4. A method as set forth in claim 3 wherein the clock signals and control signals which are generated at said one unit are passed from said one unit to said other unit over a first unidirectional line and said clock signals which are returned from said other unit to said one unit and said control signals which are passed from said other unit to said one unit are passed to said one unit over a second unidirectional line.

5. A method as set forth in claim 1 wherein the step of shifting the phase comprises the steps of:

writing the data passed from said other unit in a buffer in said one unit with timing by the clock signals passed from said other unit; and reading said data from said buffer with timing by the clock signals generated in said one unit.

6. A method as set forth in claim 5 further comprising the steps of:

locating said writing into said buffer by a write pointer which is incremented whenever a clock signal is received from said other unit, and locating said reading from said buffer by a read pointer which indicates locations in said buffer from which to read said data.

7. A method as set forth in claim 5 further comprising the steps of:

making at least four different, successive copies of said write pointer during each cycle of said clock signal; and reading said data from said buffer when a latest write pointer copy is further advanced than a current location of said read pointer, and avoiding reading of said buffer when said latest copy is less advanced than the current location of said read pointer 8. A method as set forth in claim 7, further comprising the step of halting said reading if said clock signals from said other unit cease to be received at said one unit.

9. A computer system or network in which clock signals and data are transferred therein, said system comprising:

a first data processing unit;

a second data processing unit, said first unit comprising a clock independent of said second unit;

first communication means, coupling said first and said second units to each other, for transmitting signals of said clock and first data synchronized with the clock signals from said first unit to said second unit, said transmitted clock signals being used to control receipt of said data by said second unit;

second communication means, coupling said first and said second units to each other, for returning said clock signals from said second unit to said first unit and transmitting second data synchronized with the returned clock signals, from said second unit to said first unit, said second data arriving at said first unit phase shifted relative to said clock; and phase alignment means, local to said first unit and receiving said returned clock signals and said second data from said second unit, for aligning a phase of said second data with a phase of said clock, said first unit processing the data after the phase alignment using said clock.

10. A computer system or network as set forth in claim 9 wherein said first unit also transmits first control signals, synchronous with said clock signals generated in said first unit, from said first unit to said second unit via said first communication means, and said second unit also transmits said second control signals, synchronous with said returned clock signals, from said second unit to said first unit via said second communication means.

11. A computer system or network as set forth in claim 9 wherein said phase alignment means comprises:

a buffer for temporarily storing said second data transmitted from the said second unit;

means for controlling writing of said second data into said buffer with timing by said clock signals returned from said second unit; and means for controlling reading of said second data from said buffer with timing from said clock.

12. A computer system or network as set forth in claim 11 further comprising:

means for selecting addresses in said buffer from which said first unit reads said second data;

a buffer write circuit having address advancing means for controlling the address selector means, the address advancing means being advanced by the clock signals returned from said second unit.

13. A computer system or network as set forth in claim 12 wherein said phase alignment means further comprises means for detecting when said clock signals cease being returned from said second unit and thereupon signalling the read control means to stop reading said second data.

14. A method as set forth in claim 1 wherein all of the steps are performed in the order listed.

15. A method as set forth in claim 1 further comprising the step of using said clock signals generated at said one unit to process data which is not sent to said other unit and not received from said other unit.

16. A method as set forth in claim 1 wherein the step of shifting the phase comprises the step of comparing the phase of the clock signals generated in said one unit to the phase of the clock signals passed from said other unit.

17. A method as set forth in claim 1 wherein said phase shift of said data and clock signals arrived at said one unit is substantially due to propagation delay of said clock signals passed from said one unit to said other unit and from said other unit back to said one unit.

18. A method as set forth in claim 1 wherein said clock signals generated in said one unit are generated independently of said other unit.

19. A method as set forth in claim 1 further comprising the step of processing the data passed from said one unit to said other unit at said other unit using a clock synchronized with said clock signals passed from said one unit.

* * * * *